United States Patent [19]

Hill

[11] 4,126,512
[45] Nov. 21, 1978

[54] PERLITIC INSULATING BOARD
[75] Inventor: John A. Hill, Branchburg, N.J.
[73] Assignee: Johns-Manville Corporation, Denver, Colo.
[21] Appl. No.: 419,023
[22] Filed: Nov. 26, 1973

Related U.S. Application Data

[63] Continuation of Ser. No. 78,204, Oct. 5, 1970, abandoned, which is a continuation of Ser. No. 826,086, May 15, 1969, abandoned, which is a continuation of Ser. No. 515,649, Dec. 22, 1965, abandoned.

[51] Int. Cl.² ............................................. D21D 3/00
[52] U.S. Cl. .................................. 162/171; 162/145; 162/175; 162/181 C
[58] Field of Search .................. 162/145, 155, 181 C, 162/171, 175, 181

[56] References Cited

U.S. PATENT DOCUMENTS

| 3,042,578 | 7/1962 | Denning ............................... 162/171 |
| 3,244,632 | 4/1966 | Schulz et al. ..................... 162/145 X |

Primary Examiner—S. Leon Bashore
Assistant Examiner—Peter Chin
Attorney, Agent, or Firm—Robert M. Krone; Joseph J. Kelly; Gregory W. O'Connor

[57] ABSTRACT

A thermal insulating board product, comprising expanded perlite, fibers, and bituminous material, also includes a relatively small amount of starch binder.

3 Claims, 7 Drawing Figures

INVENTOR.
JOHN A. HILL

ATTORNEY

PERLITIC INSULATING BOARD

This is a continuation of application Ser. No. 78,204, filed Oct. 5, 1970, abandoned, which in turn is a Continuation of application Ser. No. 826,086 filed May 15, 1969, abandoned, which in turn is a Continuation of Appl. Ser. No. 515,649 filed Dec. 22, 1965, abandoned.

This invention relates to insulating boards, and, more particularly, to an improvement in the type of insulating board which contains expanded perlite particles, fibers and bituminous material. This type of board, which has been commercially available for some years, is a highly satisfactory insulating product and is well adapted for use as a roof insulating board, since it provides good thermal insulation, is adequately resistant to fire and to water absorption, and is economical to manufacture. Like many other very adequate building materials, however, it has certain properties which it would be desirable to improve.

While the strength of the board is adequate for its primary use, the board is subjected to a certain amount of abuse during handling, shipping, installation, and roof repair and is somewhat susceptible to breakage or fracture. It would be desirable, therefore, to increase the rigidity of the board and its resistance to impact and compression forces. Also, it would be desirable to increase the interlaminar strength of the board to improve its resistance to high wind loads which tend to lift the roof and the roof insulation boards from the roof deck. In addition, it would be desirable to improve the condition of the surface of the board, which tends to become rather dusty and crumbly due to the collecting of small particles of expanded perlite on it. This condition is aggravated by the sliding action of the packaging material over the board as the board is wrapped and removed from the package and also by the handling and jostling received by the board during shipping. The loose particles also tend to interfere with the adhesive used to bond the boards to the roof deck and are objectionable to workmen handling the board.

The problem of how to improve the physical properties of the board is more difficult than might initially appear. A balance must be maintained between the various ingredients of the board to provide the board with adequate strength, fire resistance, thermal insulating value, resistance to water absorption, and other desirable physical properties. This requires a relatively low density board, generally in the range of about 9-12 pounds per cubic foot, and one that can be economically manufactured on a continuous basis. It would not be desirable to use ingredients that would substantially reduce the amount of voids in the board, either the voids within or between the expanded perlite particles, or that would impair any of the necessary physical properties of the board or make it more difficult to manufacture. With respect to the manufacture of the board, which involves use of an aqueous slurry containing the board ingredients, it would not be desirable to use an ingredient that increases the drainage time of such a slurry. Further evidence of the difficulty in improving the physical properties of the board is provided by the fact that the industry, after considerable experimentation with various formulation changes and binder systems, appears to have concluded that the optimum formulation for providing the most desirable set of overall properties practically available in these boards was reached with the formulations of the commercially available boards.

In such a board the expanded perlite particles contribute several important properties. Being light in weight, they act as a bulking material to maintain the density of the board at a low level. Densities of 10 or 11 pounds per cubic foot have been obtained by using about 60% to 70%, by weight of the board, of expanded perlite particles, which themselves have a density of approximately 3 to 5 pounds per cubic foot. Generally, the expanded perlite used in the manufacture of insulation boards is of such grade that a major portion of the particles is capable of passing through a 20 mesh screen and a lesser, but substantial, portion is capable of passing through a 100 mesh or finer screen. Being inorganic, expanded perlite particles contribute to the fire resistance of the board. In addition, they have excellent thermal insulating properties and contribute effectively to the insulating value of the boards.

The fibers in the commercially available boards are cellulosic in nature and are present in substantial amounts, primarily for the strength they add to the board, but also because they too act as a bulking material, assisting the expanded perlite in maintaining the density of the board at the desired level. Newsprint fibers are commonly used, usually in the range of about 15% to 25%, by weight of the board, since they are readily available and can readily be interfelted to assist in holding the expanded perlite particles in place.

The bituminous material in the commercially available boards provides resistance to water absorption and also assists the fibers in holding the material of the composition together in board form. Although other sizing or binder material probably would function suitably, asphalt or other bituminous compounds generally have been preferred because they are relatively inexpensive, readily available and they adequately perform their intended function. Generally, asphalt is present in amounts of about 5% to 10%, by weight of the board.

One method of increasing the strength of such a perlitic roof insulation board might seem to be to use a high strength binder material instead of asphalt, but this is not very practical since most binder materials, in order to effectively provide the board with greater strength than it already possesses due to the asphalt, have to be used in such large quantities that the board could not be economically manufactured. By substituting such binder material for asphalt, moveover, the resistance of the board to water absorption is generally lessened to a great deal, and where the binder is organic, the fire resistance of the board, if large enough amounts of the binder are used, is also decreased. To provide the board with the desired density and strength, fire resistance, and adequate insulation properties, the amounts of expanded perlite particles, which represent the inorganic material in the board, and cellulosic fibers present in the board should be maintained at about the levels of these ingredients in the commercially available perlite-fiber-asphalt boards described above, thus limiting the amount of binder and/or sizing material that can be used. There has thus been little reason for the trade to hope to produce perlitic boards of this type which would have any markedly improved properties of commercial significance without at the same time detrimentally affecting one or more other properties to a commercially undesirable extent.

It is an object of this invention to provide a perlite-fiber-bituminous material insulating board having improved physical properties.

Another object is to provide such a board which exhibits certain improved physical properties and in which there is no significant loss of any of the desirable properties exhibited by the commercially available board.

Another object is to provide such a board which has adequate fire resistance and resistance to water absorption.

A further object is to provide such a board which is economical to manufacture and the manufacture of which does not require extensive modifications of existing manufacturing equipment.

Briefly, this invention comprises the discovery that the inclusion of starch in definite minor amounts, of about 0.3% to about 5.0% by weight of the composition, along with the bituminous material and the other ingredients in compositions of the type described, effects substantial improvements and increases in physical strength of the products without degrading their other properties.

While starch is known to be an effective binder when used in substantial amounts in fibrous compositions, it normally would be expected that any increased strength it might provide in a perlite-fiber bituminous material board would be more than offset by the adverse effects it would cause. Being organic, starch would be expected to detract from the fire resistance of the board, and being hygroscopic in nature it would be expected to reduce the resistance of the board to water absorption. Further, starch is notorious for its adverse effect on water drainage when contained in products manufactured by free-draining continuous process equipment, such as a Fourdrinier machine. Contrary to these expectations, however, when starch is employed in the manner disclosed hereinafter, the resulting board product is greatly improved, and the process is not adversely affected to any significant degree.

While the prior art broadly discloses compositions containing both starch and bituminous material, it is clear that there is no suggestion that starch may be used with bituminous material as part of the binder system in a perlitic insulating board, and certainly not in the small amounts utilized in this invention. The prior art relating to fibrous board containing both starch and bituminous material seems to be limited to disclosures of starch bonded boards subsequently impregnated with a bitumen, boards in which the bonding effect of one of the ingredients is only temporarily effective, and boards in which either the starch or bituminous material or both are present in very large quantities in comparison to the composition of the present invention. Examples of such disclosures are U.S. Pat. Nos. 811,778; 1,664,601; 1,912,094; and 3,166,466. It also appears that the prior art dealing with starch and bituminous material in the same board composition does not relate to perlitic boards but discloses loading a fibrous composition with enough binder to substantially fill the spaces between the fibers, whereas in the board of the present invention the bituminous material and starch are present in quantity and arrangement so as not to substantially decrease the volume of the voids or interstices between the expanded perlite particles. These voids or spaces contribute effectively to the thermal insulating properties of the board and should not be filled with binder.

The nature of the invention will be more fully understood and other objects may become apparent when the following detailed description is considered in connection with the accompanying drawing, wherein.

Figure 6:
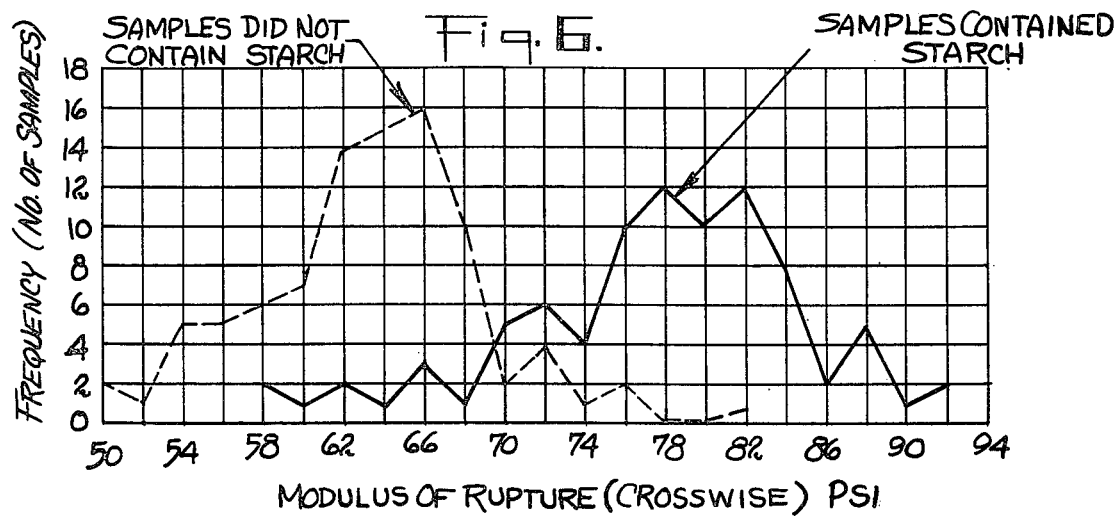
Figure 7:
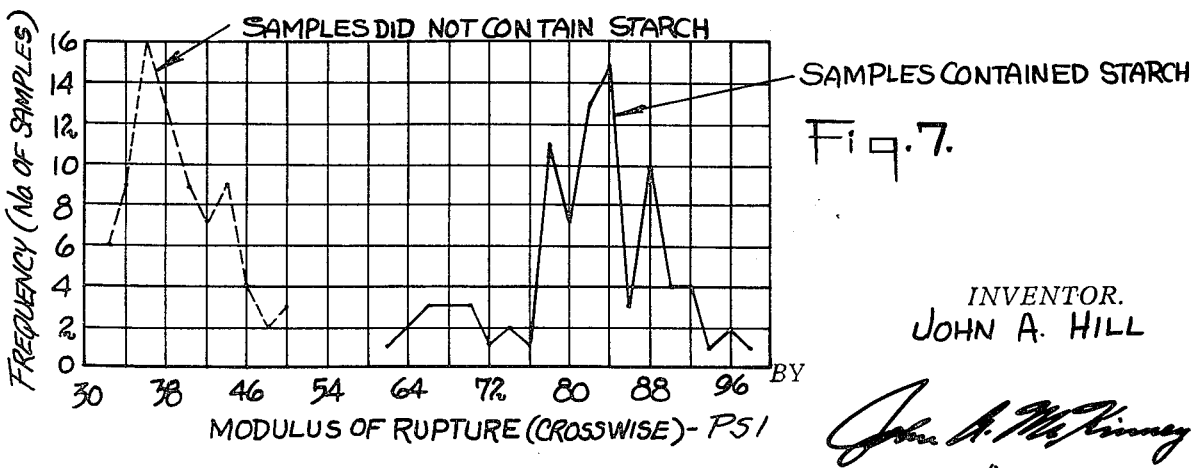

FIG. 6 is a graphical representation illustrating the range of distribution of the modulus of rupture for a number of samples taken at random during the production of a perlite-fiber-asphalt board, compared with a similar graphical representation for samples taken at random during the production of perlite-fiber-asphalt board of the same type but containing starch; and FIG. 7 is a graphical representation similar to that of FIG. 6 but made in connection with a perlite-fiber-asphalt board containing asphalt having a much lower softening point that the asphalt employed in the boards used for obtaining the data to plot the graphical representation of FIG. 6.

Throughout the following description, the percentages in which the various ingredients of the board are stated to be present will be by weight of the solids present in the final board product, unless otherwise specified.

Referring to the drawing, the graphs shown in FIGS. 1 to 4 illustrate the increase in the modulus of rupture and the interlaminar tensile strength due to the presence of starch. To obtain the data used to plot the graphs of FIGS. 1 and 2, a series of boards containing expanded perlite particles, cellulosic fibers, asphalt, and varying amounts of starch was formed. The final composition of the control board, which did not contain starch was as follows:

| | |
|---|---|
| Expanded perlite particles | 68.9% |
| Newsprint fibers | 24.7% |
| Asphalt (S.P. 210° F.) | 6.4% |
| Total | 100.0% |

The board was made by mixing the ingredients together in water to make an aqueous slurry having a solids consistency, by weight, of about 5%. The asphalt was added as an aqueous emulsion of 58% solids content. The Ring and Ball penetration value of the asphalt at 77° F. was 0. The mixture was then formed into a one inch thick wet mat on a TAPPI Standard handboard former, constructed and operated in accordance with TAPPI Test T 1001 m-60, entitled "Forming Insulating Board For Physical Tests", and was then subjected to a flat pressing operation at room temperature to consolidate the material, after which the board was dried first at about 400° F. for one hour and then at about 300° F. for 2½ hours. The moisture content of the board on entering the drier was about 23% to 25% of the total board solids, and after the drying operation was about 1%. The resulting board had a density of about nine pounds per cubic foot.

Starch was added to the composition of the control board to produce, in the same way, further samples, each sample containing starch in an increased increment, as further described below, starting with as little as 0.3%, by weight of the total board solids, of starch retained in the board. The starch was added in the form of raw tapioca starch grains which were included in the other solids at the time of making the aqueous slurry. The tapioca starch grains were cooked in the drier to form the gel-like cooked starch material which functions as a binder.

The interlaminar tensile strength of the samples was determined in accordance with the test procedure described in ASTM C 209, entitled "Testing Fibers:, in the section entitled "Tensile Strength Perpendicular To Surface". The modulus of rupture of the boards were determined according to the test procedure described in ASTM D 1037, entitled "Evaluating The Properties Of Building Fiberboards", in the section entitled "Static Bending".

Figure 1:
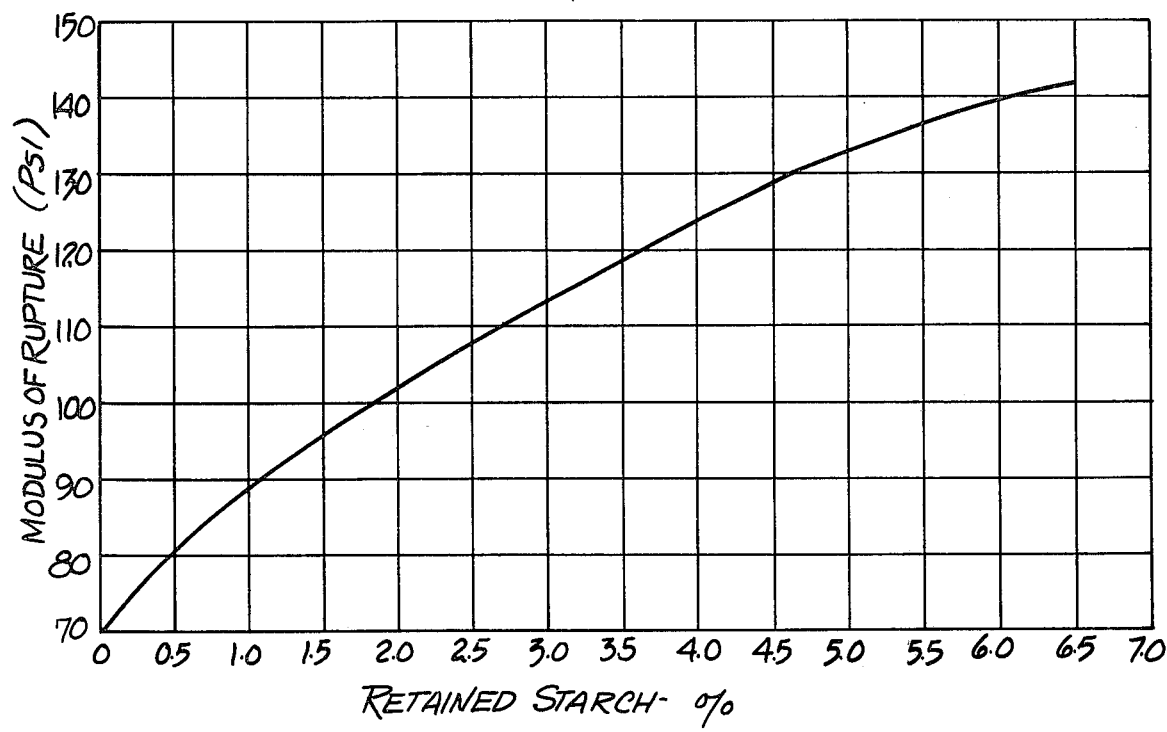
FIG. 1 is a graphical representation of the relationship of the modulus of rupture of a perlite-fiber-asphalt board to the amount of starch it contains.

As shown in FIG. 1, the modulus of rupture of the insulating board increased sharply with only very small quantities of starch in the board composition. As greater quantities of starch were included in the board composition, the modulus of rupture continued to increase, but not at as rapid a rate. The rate of increase of the modulus of rupture per increment of starch contained in the board appears to be noticeably less, beginning at approximately 1.5% to 2% of starch in the board composition, and appears to lessen gradually as the starch content is increased.

Figure 2:
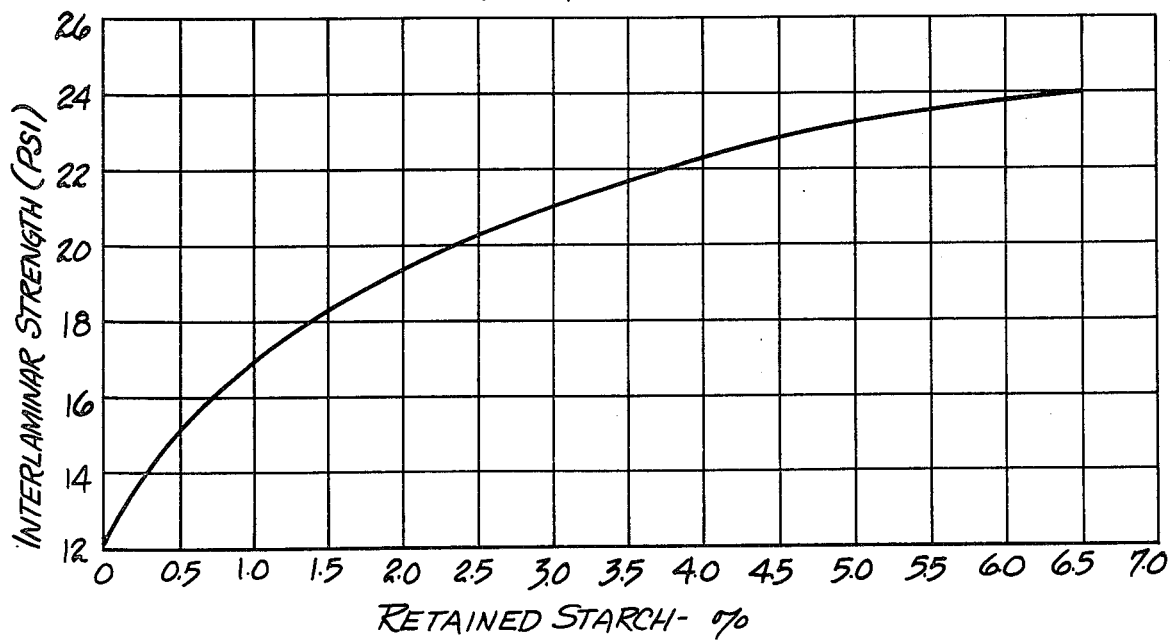
FIG. 2 is a graphical representation of the relationship of the interlaminar strength of a perlite-fiber-asphalt board to the amount of starch it contains.

As shown in FIG. 2, the interlaminar tensile strength increased very sharply with only minor amounts of starch in the board and continued to increase with the presence of added starch, but not at as great a rate. The slope of the curve definitely decreases at about 0.5% to 1.0% of starch content and again, although not as sharply, at about 3.5% to 5.0% starch content, where the curve seems to be leveling. Thus, even with only about 0.5% of starch in the board composition, the interlaminar tensile strength increased from 12 psi to 15 psi, an increase of more than 25%, and with only 1% of starch in the board composition, it increased to 17 psi, an increase of more than 40%. Similar surprisingly high increase of stength for such low starch content is also noticeable in the curve of FIG. 1, wherein only 0.5% of starch raised the modulus of rupture from 70 psi to about 80 psi, an increase of more than 14%, and only 1% of starch raised the modulus of rupture to about 89 psi, an increase of more than 20%.

In the samples produced in connection with the curves of FIGS. 1 and 2, starch was added to the composition of the control board in progressively increasing increments, as indicated above, to produce samples containing, in the final sample boards tested, starch in progressively increased amounts. This means that as the starch content increased, the percentage amount, as distinguished from the actual amount, of each of the other solid ingredients, based on the total amount of solid ingredients in the sample as 100%, was slightly decreased. Thus, the percentage of organic material in the board samples was progressively increased while the percentage of inorganic material, that is, the expanded perlite particles, was progressively decreased. In order to eliminate any possibility that the increased strength of the samples containing starch was due in large part to the increased organic content, another series of samples was made by the same method used in fabricating the samples described above, and the data used in drawing the curves shown in FIGS. 3 and 4 was obtained. The control sample did not contain starch and was made of the same composition as the control sample made in connection with FIGS. 1 and 2. But as starch was added in progressively increased amounts in forming the test samples, a substantially similar amount of newsprint fibers was subtracted in order that the organic content of the samples tracted in order that the organic content of the samples would remain substantially constant.

Figure 3:
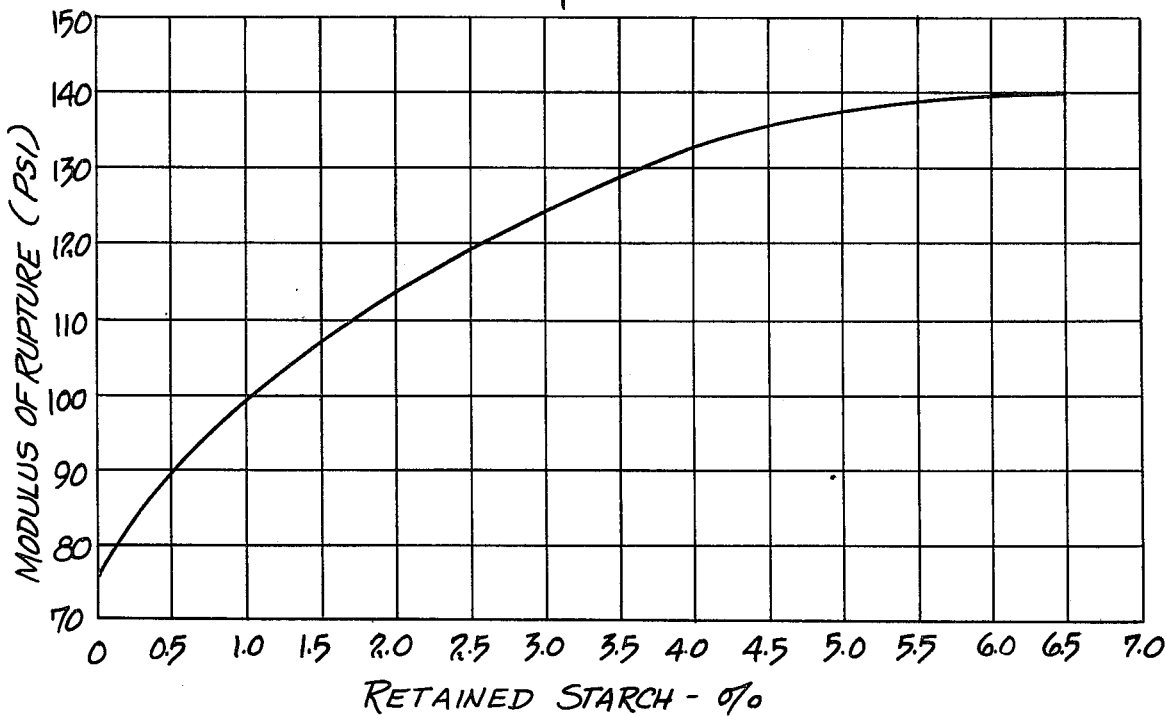
FIG. 3 is a graphical representation similar to that of FIG. 1 except that the fiber content of the board composition was decreased in proportion to the amount of starch added to maintain the organic content of the various board samples at substantially the same level throughout the modulus of rupture tests.

As shown in FIG. 3, the modulus of rupture of this second set of samples increased sharply as the starch content increased, and even at the low amount of 0.5% of starch in the board the modulus of rupture increased from about 76 psi to about 89 psi, an increase of more than 17%, while at 1% starch content the modulus of rupture increased to about 99 psi, an increase of about 30%. The rate of increase of the modulus of rupture became less as additional starch was added and the curve seems to level off very noticeably at about 5% starch content.

Figure 4:
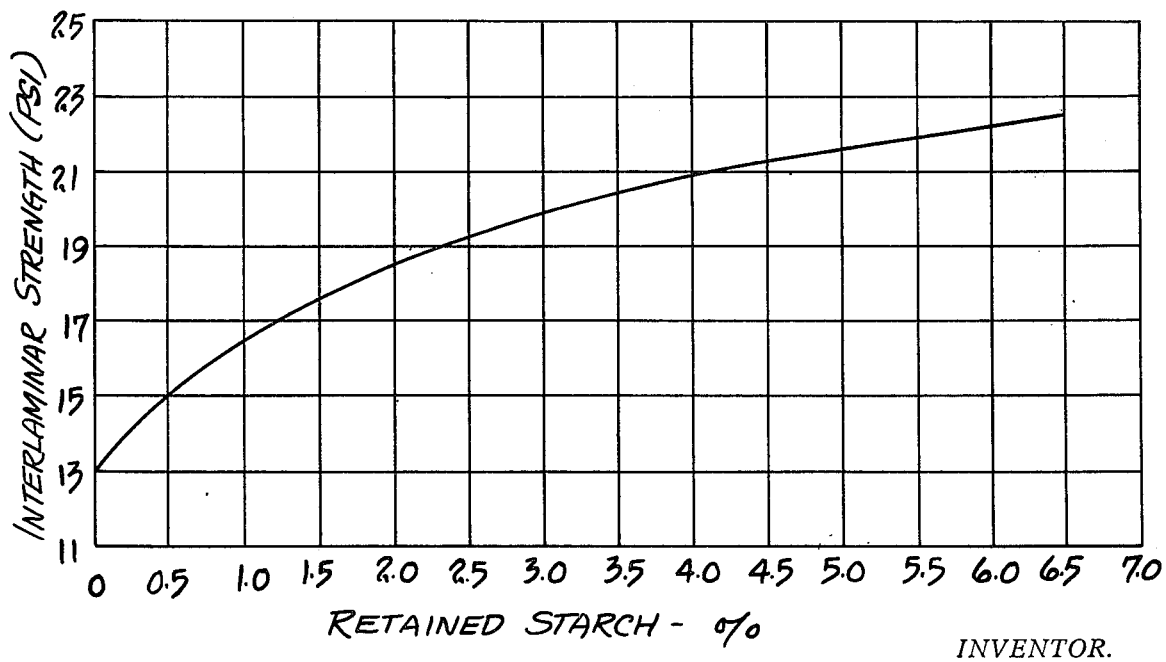
FIG. 4 is a graphical representation similar to that of FIG. 2, except that the fiber content of the board composition was varied in the manner described in connection with FIG. 3.

In FIG. 4, the increase in interlaminar tensile strength of boards of this second set of samples is illustrated. The interlaminar tensile strength also increased sharply with the addition of minor amounts of starch, and as additional starch was added the increase in strength was not as great, appearing to level off noticeably below about 4.5% or 5% starch content. At 0.5% of starch content the interlaminar tensile strength increased from 13 psi to about 15 psi, an increase of more than 15%, while at 1% of starch content the interlaminar tensile strength increased to about 16.5 psi, an increase of about 27%.

The modulus of rupture of an insulating board is significant with respect to the overall strength and rigidity of the board, particularly with respect to the ability of the board to be handled somewhat roughly, which often occurs in the field, to withstand traffic over it, and to be capable of spanning relatively widely spaced roof deck supports. With an increase in the modulus of rupture, the chances of breakage or fracture of the boards due to abuse during handling or shipping is greatly reduced. The interlaminar tensile strength, as indicated previously, is of major significance in resisting blow-off due to high velocity winds.

Figure 5:
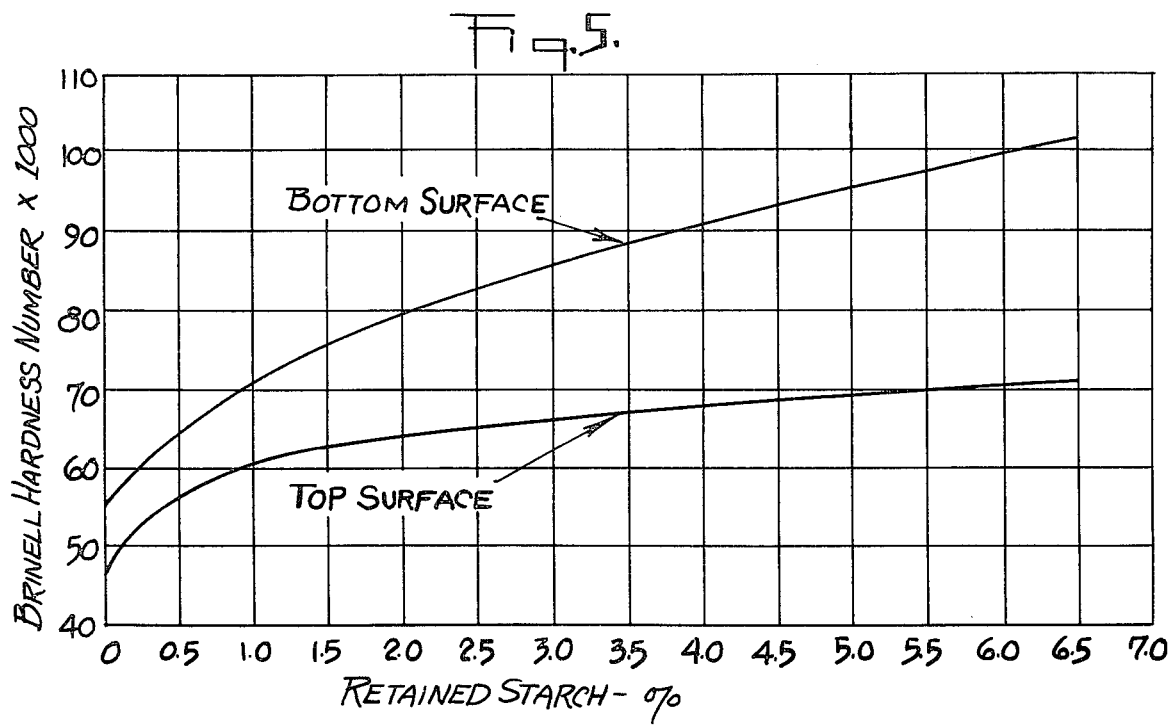
FIG. 5 is a graphical representation of the relationship of the surface hardness of a perlite-fiber-asphalt board to the amount of starch it contains.

Referring to FIG. 5, the samples made for testing the modulus of rupture and the interlaminar tensile strength in connection with plotting the graphs of FIGS. 1 and 2 were also tested to determine the hardness of both their top and bottom surfaces. The hardness data was obtained in accordance with the Brinell hardness test and was carried out by pressing a one inch diameter steel ball, exerting an initial load of two pounds when resting on the surface of a board sample, into the sample under an additional load of 12 pounds and measuring the resulting indentation. The Brinell hardness number, multiplied by 1000, equals 2.69 divided by the number of millimeters the material is indented. The hardness of both surfaces increased sharply with the addition of small amounts of starch and continued to increase with progressively larger amounts of starch contained in the boards, but not at such a rapid rate. At about 0.5% starch content, the Brinell hardness number was about 56 for the top surface as compared to 47 for the top surface of the control board containing no starch, an increase of about 19%. At 1.0% stach content, the top surface had a Brinell hardness number of about 60, an increase of about 28%. The Brinell hardness number for the bottom surface of the control board was 56, while at 0.5% starch content it was about 64, an increase of more than 14%. At 1.0% starch content the bottom surface had a Brinell hardness number of about 71, an increase over the hardness of the control board of about 27%. The curves for both surfaces rise very rapidly up to about 0.5% starch content and then continue to rise at a more gradual rate. The curve for the top surface of the board levels off considerably more than the curve for the bottom surface.

The significance of the hardness of the board relates to the susceptibility of the board to be punctured by workmen walking over it and dropping hard objects on it during construction of the roof. Not only did small amounts of starch increase the surfce hardness of the board but, surprisingly, it also made the surfaces of the board substantially dust-free. This seems to be because the starch, in combination with the asphalt, holds the ingredients together adjacent the surfaces of the board, including the minute dust particles that heretofor made the surface dusty, and makes the surface of the board tougher so that it is also better able to hold the particles in place. The surface of the board, instead of being dusty or crumbly, as it sometimes tended to be when asphalt alone was used as a sizing and/or binder material, was hard and substantially smooth.

Referring to FIG. 6, perlite-fiber-asphalt board of the following formulation was manufactured on a Fourfrinier machine:

| | |
|---|---|
| Expanded perlite | 71.0% |
| Newsprint fibers | 20.6% |
| Asphalt (S.P. 210° F.) | 8.4% |
| Total | 100.0% |

The Ring and Ball penetration value of the asphalt at 77° F. was zero. A number of samples were taken at random from the board production and tested according to ASTM D 1037, referred to above, to determine their modulus of rupture, the results of which have been rounded off to the nearest even number of facility in plotting. The dotted line in FIG. 6 represents the frequency with which various values of the modulus of rupture occurred. The solid line represents the same type of curve, but made with respect to board samples selected at random from the production of perlite-fiber-asphalt board of the following formulation:

| | |
|---|---|
| Expanded perlite | 71.0% |
| Newsprint fibers | 21.7% |
| Asphalt (S.P. 210° F.) | 6.5% |
| Starch | 0.8% |
| Total | 100.0% |

As indicated by the different formulations, the ingredients of the first board are present in the second board in substantially the same amounts, but the second board contains a small amount of starch, whereas the first board does not.

The average density of the board samples which did not contain starch was 11.2 pounds per cubic foot, while the average density of the board samples containing starch was 10.4 pounds per cubic foot. Despite the greater density of the former board the latter exhibited a substantially greater value of modulus of rupture. The average modulus of rupture of the bulk of the board samples not containing starch seems to lie in the range of about 60–67 psi, whereas the average modulus of rupture of the bulk of the board samples containing starch seems to lie in the range of about 74–85 psi, a significant increase, particularly when considering the small amount of starch present in the latter samples.

Referring to FIG. 7, the same type of curves as shown in FIG. 6 are illustrated, but with respect to boards containing asphalt of much lower softening point than the asphalt used in the samples discussed in connection with FIG. 6. To obtain the data used in plotting the dotted line curve of FIG. 7, perlite-fiber-asphalt board of the following formulation was manufactured on a Fourdrinier machine:

| | |
|---|---|
| Expanded perlite | 72.0% |
| Newsprint fibers | 22.5% |
| Asphalt (S.P. 120° F.) | 5.5% |
| Total | 100.0% |

To obtain the data used in plotting the solid line curve of FIG. 7, perlite-fiber-asphalt board of the following formulation was manufactured on a Fourdrinier machine:

| | |
|---|---|
| Expanded perlite | 70.0% |
| Newsprint fiber | 23.8% |
| Asphalt (S.P. 120° F.) | 5.0% |
| Starch | 1.2% |
| Total | 100.0% |

The Ring and Ball penetration value of the asphalt at 77° F. was in the range of 30–60.

The average density of the samples of both types of board was about 10.8 pounds per cubic foot. It can be seen that even though the binding power of the asphalt used in these samples is less than the binding power of the asphalt used in the samples discussed in connection with FIG. 6, the bulk of the samples containing starch had a modulus of rupture in about the same general-range as the bulk of the samples containing starch of FIG. 6, and all of the samples containing starch had a modulus of rupture considerably higher than, and in some cases two to three times as high as, the samples which did not contain starch. This is an outstanding improvement, made possible by the small amount of starch in the finished board product.

To test the resistance of the board to water absorption, samples of board containing starch were made up in the same manner as discussed in connection with the samples used to obtain the data for plotting the curves of FIGS. 1 and 2, and the samples were tested according to the section entitled "Water Absorption" in ASTM Test C-209, entitled "Testing Structural Insulating Board Made From Vegetable Fibers". According to this test procedure the samples are first weighed, then immersed in water for 2 hours, then removed and weighed again to determine the amount of water absorbed in that time. As an added test, the same test procedure was used except that the samples were immersed for 24 hours. The following table indicates the percentage of water absorption for the two time periods tested for samples containing the amounts of starch indicated, the starch having been added to a base composition the same as that of the control boards made in connection with the series of sample boards discussed above, namely, solids content of 68.9% expanded perlite particles, 6.4% asphalt and 24.7% newsprint fibers in the control board, these percentage values progressively decreasing slightly in the test samples as starch was added in progressively increasing amounts for the various samples. The percentage of starch in the samples was by weight and based on the total weight of the solids content of the final board samples.

| Sample | Starch Content(%) | Water Absorption by Volume(%) 2 hours | 24 hours |
|---|---|---|---|
| 1 | 0.0 | 1.5 | 4.9 |
| 2 | 0.3 | 1.7 | 3.0 |
| 3 | 0.6 | 1.7 | 2.8 |
| 4 | 1.3 | 1.6 | 3.7 |
| 5 | 2.3 | 1.6 | 2.2 |
| 6 | 2.6 | 2.0 | 2.5 |
| 7 | 3.6 | 1.7 | 3.3 |
| 8 | 4.7 | 2.3 | 5.2 |
| 9 | 5.6 | 1.8 | 5.9 |
| 10 | 5.6 | 1.6 | 4.2 |
| 11 | 6.5 | 1.9 | 4.5 |
| 12 | 7.6 | 2.0 | 5.4 |
| 13 | 11.1 | 2.1 | 5.1 |

When it is considered that starch tends to absorb moisture, it is remarkable that the water absorption values are so low, even when the board contains as high as 11.1% of starch. Asphalt naturally contributes to the water resistance of the board, but it was unexpected that the starch did not offset the water resistance properties of the asphalt to a substantial extent.

To illustrate the high water absorptivity of a starch bonded board of this type which contains no asphalt or other sizing material, several board samples were made up containing expanded perlite and newsprint fibers in the same relative proportions in which they were present in the base composition used to obtain the water absorption data for Samples 1 – 13, but containing small amounts of tapioca starch, instead of asphalt, as the only other ingredient. These results are as follows:

| Sample | Starch Content(%) | Water Absorption by Volume(%) 2 hours | 24 hours |
|---|---|---|---|
| 14 | 0.8 | 4.8 | 28.4 |
| 15 | 2.3 | 7.0 | 22.8 |
| 16 | 3.8 | 9.0 | 30.0 |

It is apparent from these figures that starch alone is actually detrimental to the resistance of the board to water absorption, even in minor amounts such as 0.8%, by weight, of the total board solids.

It is known that it has been stated in the past that a perlite-fiber board bonded with starch (10%) and containing no asphalt displays unexpected water resistance, in that prolonged soaking in water for a period of three weeks caused the board to be only slightly softened. Such tests merely prove, however, that a fiber-perlite-starch board can contain a large amount of water without disintegrating, the amount of water being greater than the amount absorbed when the board is tested in accordance with ASTM Test C-209. The ASTM Test is far more significant since it is designed to determine the absorptive characteristics of the board. The problem to be concerned about is not so much whether a board can hold a certain large amount of water for a long time without disintegrating but whether water entering an insulating board through a failure in the roof covering material will be substantially contained in that general local area instead of spreading rapidly throughout the entire insulating layer due to the high absorptivity of the board. Since excess moisture in a board has a deleterious effect on the strength and insulation value of an insulating board it is important that any such effects due to moisture's entering the board at a point of roof failure be kept in the local area adjacent the failure as much as possible. The low absorptivity of the board of the present invention protects against the undesirable spreading of excess moisture.

To demonstrate further the unexpected improvement of physical properties in perlite-fiber-bituminous material roof insulating boards containing small amounts of starch, boards without starch were made according to the following typical formualtion, by weight, of solids ingredients contained in the finished board product:

| | |
|---|---|
| Expanded perlite | 70.0% |
| Newsprint fibers | 23.8% |
| Asphalt (S.P. 120° F) | 6.2% |
| Total | 100.0% |

Other boards were made containing starch according to the following formulation in which the percentage amounts are based, by weight, on the total solids content of the finished board product:

| | |
|---|---|
| Expanded perlite | 70.0% |
| Newsprint fibers | 23.8% |
| Asphalt (S.P. 120° F.) | 5.0% |
| Starch (S.P. 120° F.) | 1.2% |
| Total | 100.0% |

The compositions of the two sets of boards differ only in the small amount of starch contained in the second set of boards and the correspondingly reduced amount of asphalt in those boards. Both sets of boards were subjected to tests to determine various physical properties. The following table illustrates the differences in physical properties between the two sets of boards, which is quite remarkable when it is considered that the percentage of starch contained in the second set of boards is so small.

| Test | Insul. Board Without Starch | Insul. Board With Starch |
|---|---|---|
| Density(pfc) | 10.6 | 11.4 |
| Ultimate load (lbs.) | 9.0 | 26.8 |
| Interlaminar Tensile Strength (psi) | 6.7 | 19.1 |
| Interlaminar Shear Strength (psi) | 15.3 | 31.8 |
| Compression - 5% Consolidation (psi) | 133.0 | 154.0 |
| Water Absorption (% by volume 3.75 hrs.) | 1.4 | 1.4 |

While an increase in density of a board would be expected to increase its strength somewhat, such an increase in strength generally would be proportionate to the increase in density. Thus, because the increase in density of the improved board containing starch is approximately 7.5%, the increase in the ultimate load, for example, would on this basis result in a value of approximately 9.7 pounds instead of the actual value of 26.8 pounds. It can be shown in the same manner that the values of the other properties tested are much higher than that which the increase in density of the sample containing starch would be expected to cause.

In making the above tests the ultimate load was determined according to the section entitled "Transverse Strength" in ASTM Test C-209, and the interlaminar tensile strength was determined according to the section in ASTM Test C-209, entitled "Tensile Strength Perpendicular To Surface", except that instead of using a sample 6 inch × 6 inch in size a sample 2 inch × 2 inch was used for convenience. Test results from this smaller size sample correlate accurately with test results made on 6 inch × 6 inch samples.

The interlaminar shear strength was determined by positioning the board in a vertical plane so that a vertical line through the uppermost corner would connect with the lowermost diagonally opposite corner, and applying a vertically directed load downwardly at the uppermost corner until the board failed in shear. The compression resistance of the boards was determined according to the section entitled "Method of Testing For Compressive Strength" in ASTM Test C-165, and the water absorption figures were determined in accordance with the section entitled "Water Absorption" in ASTM Test C-209, except that the samples were immersed in water for a period of 3.75 hours instead of the specified two hour time period. Both boards had an insulation "C" value of 0.36, and were approximately one inch thick, which is considered highly satisfactory in the industry.

The ultimate load test results indicate the greatly improved strength of the boards containing the small amount of starch over that of the boards without starch. The interlaminar tensile strength and the interlaminar shear strength of the boards containing starch are much greater than that of the boards without starch and indicate the superior performance which would be expected of the starch-containing boards when subjected to high velocity winds tending to lift the boards from the roof deck. In such an event, in all probability, the bond between the boards and the roof deck would fail before the boards themselves would fail. The compression resistance of the boards containing the starch indicates that they are able to withstand the compression and impact of workmen walking over them during installation or repair of a roof. The water absorption data indicates that the addition of starch to the roof insulation board does not adversely affect its resistance to water absorption.

To illustrate further the surprising strength of the roof insulation board of the present invention, tests were performed to determine its horizontal interlaminar shear strength. This test was conducted by constructing a three-ply built-up roof, using commercial 15 pound asphalt saturated asbestos felt, over roof insulation boards bonded to steel decking in 2 feet × 12 feet assembly. The asphalt used between the plies of roofing felt, between the felt and the boards, and between the boards and the deck had a softening point of 190° F. The deck assembly was shear loaded by a jack positioned against the end of the deck while the built-up roof, comprising the insulating boards and felt plies, was clamped and held in place. The load was applied by the jack until failure of the roof, which was evidenced in this test by tensile failure of the felt plies at a jack loading of 1540 pounds. The boards themselves remained intact.

The significance of the horizontal interlaminar shear test is its indication of the resistance of the board to stresses induced by building movement and membrane movement caused by changing moisture and thermal conditions. The ability of the board to resist simulated building movement up to at least 1540 pounds force without splitting or otherwise failing is considered by the industry to indicate more than adequate performance.

The general formula of the insulating board composition of the present invention, by weight of the total ingredients in the finished board product, is as follows:

| | |
|---|---|
| Expanded perlite | 40% – 75% |
| Fibers | 15% – 55% |
| Bituminous material | 3% – 10% |
| Starch | 0.3% – 5% |

This composition is in keeping with the composition generally accepted by the industry as meeting the many requirements of a commercially satisfactory insulating board and yet yields a much stronger board product, as indicated by the various test results described above. The fibers preferably are cellulosic in nature, such as, for example, newsprint fibers, although other types of reinforcing fibers could also be used, such as, for example, other forms of cellulosic fibers, mineral wool fibers, asbestos fibers and glass fibers. Combinations of cellulosic and mineral fibers also can be used as discussed in more detail hereinafter. The bituminous material preferably is asphalt because it has been found to function adequately in the board product, is economical, and is readily available. It is preferred that the asphalt have a softening point of at least 120° F. in order to permit manufacture on a continuous forming machine, such as a Fourdrinier machine. Other bituminous materials could be used, however, as will be appreciated by those skilled in the art. The starch used preferably is a tapioca starch because it provides adequate strength while having a relatively low cooking temperature, which enables it to be mixed in the form of raw grains with the other ingredients and cooked in place when the board is in the drier. Other types of starches, such as corn starch, for example, would also function suitably in the board and, depending upon the type, can also be cooked, without extensive equipment modifications, in the drier, but because of their generally higher cooking temperatures in most cases such starches probably would be added in cooked form, which is not as desirable from a processing viewpoint because of the cooking equipment necessary and the adverse effect cooked starch has on the drainage time of free draining board making processes.

In addition to the various test results discussed above, which indicate that only small amounts of starch are required in the board of this invention to greatly improve its physical characteristics and also that the rate of increase in strength of the board is noticeably less once the starch content reaches a low percentage of the total board solids (not more than about 4.5% or 5%), there are other reasons why the starch content should be kept no higher than the maximum limit of the range indicated in the general formula. Insulating boards tend to take on moisture from the air inside of the building, and as the humidity fluctuates the moisture content of the board fluctuates accordingly, resulting, in effect, in cyclic wetting and drying. Each time the board dries it has a tendency to shrink a minute amount, which has an adverse effect on the dimensional stability of the boards. It has been found that as the starch content is increased the tendency to shrink due to cyclic wetting and drying is also increased. Further, when perlitic insulating boards of the type disclosed herein contain too much starch they tend to dry more slowly because the starch attracts water as it cooks and does not readily give it up, even when exposed to high temperatures. This requires the drying time to be increased proportionately, which can cause the drying operation to become very expensive since drier equipment is costly and the length of time the board is required to be in the drier has a substantial effect on the cost of the manufacturing process. Other factors involving starch which contribute to the cost of the insulating board and which make it desirable to keep the starch content as low as the strength of the board will allow are the cost of the starch, the equipment required for handling it, especially if the starch is cooked before being added to the composition, and the decrease in production speed caused by the presence of starch in the slurry, especially when the starch is added in cooked form. Therefore, in order to maintain dimensional stability of the board, to minimize the cost of the board and also to provide the board with a highly adequate increase in physical properties without adversely affecting other properties of the board the starch content of the finished board product should be no more than about 5%.

At times during installation of roof insulating boards they become wet, causing the cellulosic fibers, when present in the board, to tend to expand. Subsequently, when the cellulosic fibers dry, they tend to shrink back to their original size. Under the influence of sun and wind the upper exposed surface of the boards often will dry before the bottom surface does, so that the cellulosic fibers adjacent the top surface tend to shrink back to original size while the cellulosic fibers adjacent the bottom surface tend to remain in their expanded condition. This phenomenon causes the edges of the board to bow upwardly and "cupping" of the board occurs. While this is not a permanent condition (the board moving back to its original planar condition when the fibers throughout the board have dried) and while the cupping movement is slight, it can act to disrupt the bond between the boards and the roof deck when slow-setting cold adhesives are used and cupping occurs before the adhesive has set. Cupping can also make the application of a built-up roof membrane over the insulating boards extremely difficult and often is the cause of poor roof application practices. This phenomenon will occur only in boards which possess enough strength to enable the edge portions of the board to lift up and be self-sustaining, such as the boards of the present invention.

It has been found that when mineral fibers are included in the composition in sufficient quantity, to contribute effectively to the strength of the board, cupping is virtually eliminated. This is because mineral fibers do not expand when wet, and if they are interspersed throughout the composition in such quantity that they effectively prevent the board from expanding at either surface, the cupping problem is solved. The amounts of mineral fibers necessary to accomplish this purpose will vary depending upon the type of fiber. The following formula is exemplary of formulations for boards of the present invention containing mineral wool fibers in combination with cellulosic fibers:

| Expanded perlite | 40% – 65% |
| Cellulosic fibers | 15% – 25% |
| Mineral wool fibers | 10% – 30% |
| Asphalt | 3% – 10% |
| Starch | .3% – 5% |

In the above example the presence of mineral wool fibers reduces the amount of expanded perlite that has to be used, since mineral wool is inorganic and resistant to fire, as expanded perlite particles are, and also contributes to the insulation value of the board. It is preferable not to substitute mineral wool fibers for the cellulosic fibers as the latter fibers hold the materials together in board form more effectively than the mineral fibers do. Because of this, a relatively large amount of mineral wool fibers should be present in the board to hold the board against expansion since the cellulosic fibers when wet tend to expand and counteract the stable condition created by the non-expanding mineral wool fibers.

The following formula is exemplary of a board of the present invention containing asbestos fibers in combination with cellulosic fibers:

| Expanded perlite | 55% – 75% |
| Cellulosic fibers | 15% – 25% |
| Asbestos fibers | .5% – 5% |
| Asphalt | 3% – 10% |
| Starch | .3% – 5% |

Since asbestos fibers have more binding strength than mineral wool fibers, not as much asbestos is needed in the board in order to combat the tendency of the board to cup due to expansion of the cellulosic fibers.

A preferred formula of the board composition containing no mineral fibers, in which the amounts of the ingredients are expressed in percentages by weight of the total solid ingredients in the finished board product, is as follows:

| Expanded perlite | 65% – 75% |
| Newsprint fibers | 15% – 25% |
| Asphalt | 4% – 8% |
| Starch | .5% – 2% |

Within this range of ingredients, a highly satisfactory, commercially acceptable board has been made and has retained the degree of resistance to fire and water absorption displayed by the board it was designed to improve, and has displayed the unexpected increase in physical properties discussed above.

The insulating board of the present invention can be manufactured in any desired suitable manner, such as by using a vacuum molding operation or a free-draining continuous operation such as that provided by a Fourdrinier machine. With respect to the Fourdrinier operation, the board may be manufactured according to the procedure described in U.S. Pat. No. 3,042,578 to Paul S. Denning, issued July 3, 1962 In either method the starch may be included already cooked in the slurry with the other solids ingredients or, as indicated previously, it may be added to the slurry in the form of raw, uncooked starch grains which will cook in the drier during the drying operation. Both the starch and the bituminous material should be dispersed throughout the aqueous slurry at the time the slurry is introduced to the board making machine. Neither ingredient lends itself to be added to the finished board by means of impregnation since this would not result in uniform distribution of the ingredient throughout the board in the amounts desired. It would tend to be excessive in some locations and deficient in others and would also tend to remain too much on the surfaces of the board.

It should be understood that small amounts of filler materials other than the ingredients specified herein could be provided in the composition as long as they do not adversely affect the properties of the board and are, preferably, for the sake of fire resistance, inorganic. An example of such an ingredient is clay, which could be present in amount up to about 5%, by weight of the total amount of solids in the board, without noticeably increasing the density or otherwise adversely affecting the board. Because of its adverse effect on rapid drainage, however, bentonite clay is not recommended where stock possessing rapid drainage characteristics is required.

It is to be understood that variations and modifications of the present invention may be made without departing from the spirit of the invention. It also is to be understood that the scope of the invention is not to be interpreted as limited to the specific embodiments disclosed herein but only in accordance with the appended claims, when read in the light of the foregoing disclosure.

What I claim is:

1. In a thermal insulating board product suitable for use as a roof insulating board and having a density in the approximate range of 9-12 pounds per cubic foot, consisting essentially of the following ingredients dispersed throughout the material in proportionate amounts, by weight, of the total amount of solids in the finished material, within the following approximate percentage ranges:
   (a) expanded perlite - 65% - 75%,
   (b) fibers - 15% - 25%, and
   (c) bituminous material - 3% - 10%, the improvement comprising
   (d) approximately 0.3% - 2% by weight of the total solids in the finished material of starch present in the board product and dispersed throughout the material.

2. A thermal insulating board product as recited in claim 1, wherein the fibers comprise newsprint fibers and the bituminous material comprises asphalt.

3. A thermal insulating board product according to claim 1 wherein the bituminous material range is from approximately 4% to approximately 8%.